United States Patent [19]

Reifenhäuser et al.

[11] Patent Number: 4,708,618
[45] Date of Patent: Nov. 24, 1987

[54] EXTRUDER DIE FOR EXTRUSION OF A THERMOPLASTIC LAMINATE

[75] Inventors: Hans Reifenhäuser, Troisdorf; Paul Reitemeyer, Troisdorf-Bergheim; Klemens Krumm, Neunkirchen-Seelscheid; Heinz Beisemann, Porz-Lind, all of Fed. Rep. of Germany

[73] Assignee: Reifenhauser GmbH & Co. Maschinenfabrik, Troisdorf, Fed. Rep. of Germany

[21] Appl. No.: 929,077

[22] Filed: Nov. 7, 1986

[30] Foreign Application Priority Data

Nov. 9, 1985 [DE] Fed. Rep. of Germany ....... 3539767
Jan. 9, 1986 [DE] Fed. Rep. of Germany ....... 3600396

[51] Int. Cl.⁴ .............................................. B29C 47/78
[52] U.S. Cl. ............................ 425/133.5; 264/40.6; 264/171; 425/192 R; 425/378 R; 425/462
[58] Field of Search ................ 425/129 R, 130, 131.1, 425/133.1, 133.5, 143, 144, 182, 190, 191, 192 R, 376 R, 378 R, 379 R, 380, 461, 462, 466, 467; 264/40.6, 171

[56] References Cited

U.S. PATENT DOCUMENTS

| | | | |
|---|---|---|---|
| 3,461,197 | 8/1969 | Lemelson | 264/171 |
| 3,536,802 | 10/1970 | Toru Uraya et al. | 264/171 |
| 3,865,665 | 2/1975 | Marion | 425/133.5 |
| 4,056,344 | 11/1977 | Lemelson | 425/133.1 |
| 4,161,385 | 7/1979 | Goldstein et al. | 425/133.5 |
| 4,197,069 | 4/1980 | Cloeren | 425/133.5 |
| 4,484,883 | 11/1984 | Honda et al. | 425/144 |
| 4,488,861 | 12/1984 | Reifenhaüser | 425/379 R |
| 4,600,550 | 7/1986 | Clören | 264/171 |

FOREIGN PATENT DOCUMENTS

3433122 3/1985 Fed. Rep. of Germany ...... 425/462

OTHER PUBLICATIONS

*Plastics World*, "Coex die offers 1% gauge control", Aug. 1984, pp. 16–18.

*Primary Examiner*—Jay H. Woo
*Assistant Examiner*—J. Fortenberry
*Attorney, Agent, or Firm*—Karl F. Ross; Herbert Dubno

[57] ABSTRACT

An extruder die for extrusion of a multilayer thermoplastic laminate, particularly in the form of a foil or plate, comprises a multicomponent block symmetric with respect to a central plane dividing a plurality of feed channels and distributing channels connected to said feed channels, at least one mouth and a central distributor channel connected to and following said mouth symmetric in relation to the axis of said extruder die as well as an outlet die following said central distributor channel. The block has on the end opposite the outlet die an additional feed channel with a round or rectangular cross section for feeding in a special plastic material which changes over into a discharge duct extending to the mouth. The additional feed channel is positioned in a cartridge which has a plurality of tempering passages distributed over the periphery and length thereof and which is mounted in a cartridge receptacle of the block and the cartridge moreover is provided with a plurality of feed ducts for providing a coating plastic material to the flow of the special plastic material.

8 Claims, 3 Drawing Figures

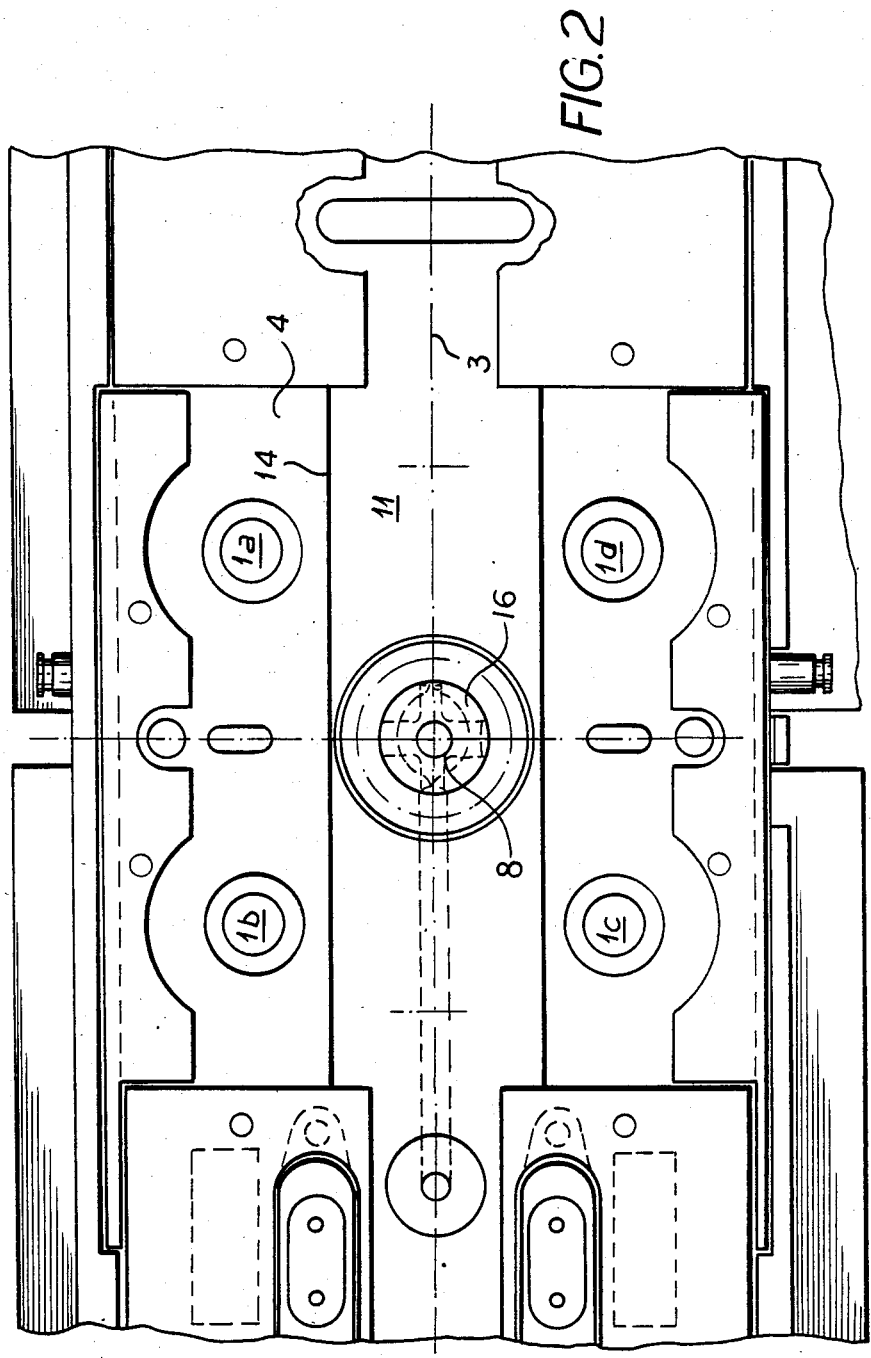

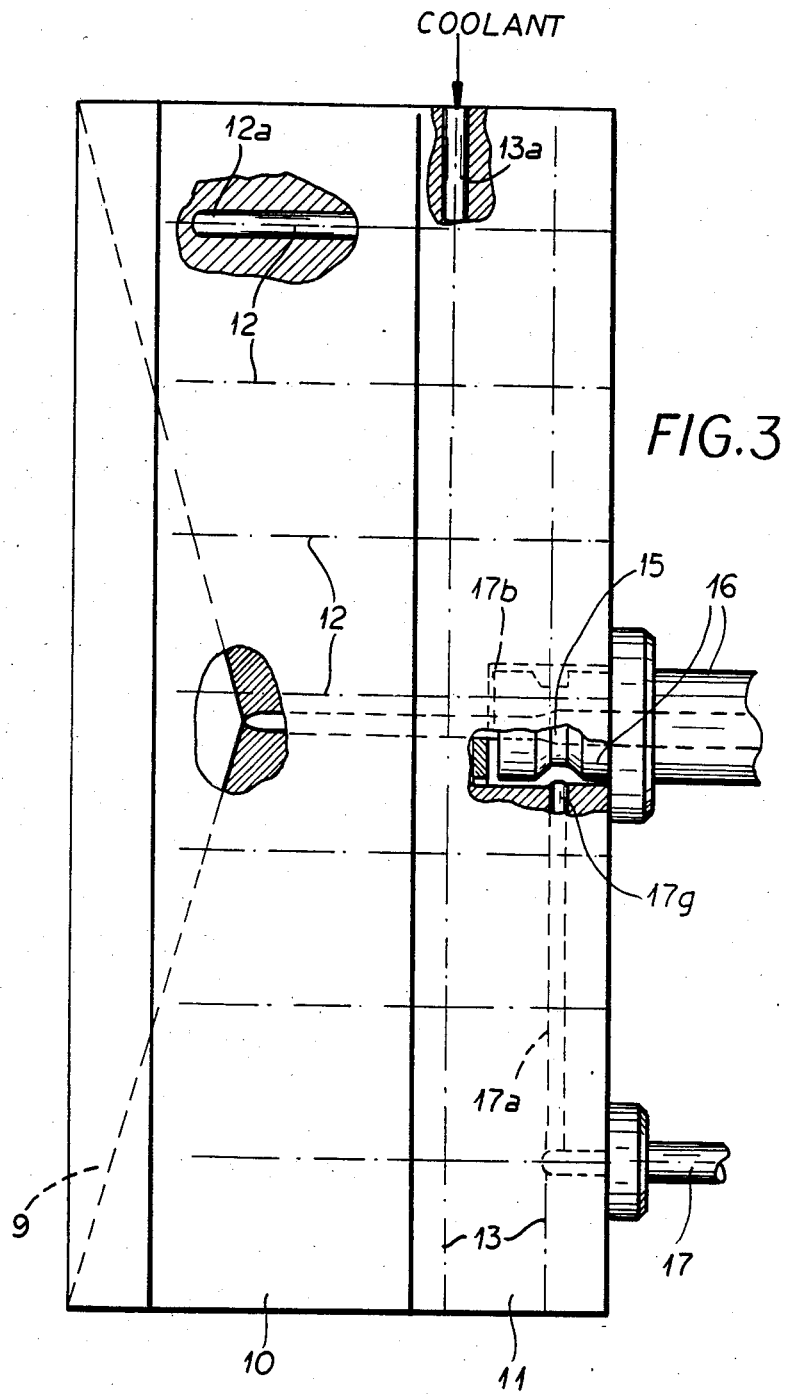

EXTRUDER DIE FOR EXTRUSION OF A THERMOPLASTIC LAMINATE

FIELD OF THE INVENTION

Our present invention relates to a broad-slit or wide-mouth extruder die used for extrusion of a thermoplastic laminate product, particularly a foil or a plate.

BACKGROUND OF THE INVENTION

An extruder die for the extrusion of a multilayer thermoplastic laminate, particularly in the form of a foil or plate, comprises a multicomponent block symmetric with respect to a central symmetric plane with respect to the feed channels and distributing channels connected to the feed channels, at least one mouth and central distributor channel connected to the mouth symmetric in relation to the axis of the extruder die as well as an outlet die following the central distributor channel.

The block on the end opposite the outlet die has an additional feed channel with a round or rectangular cross section for feeding in a special plastic material. The additional feed channel becomes a discharge duct extending to the mouth downstream.

The term "special plastic material" is used for the central layer and this layer is generally used to form a barrier layer which is impervious to moisture or gases. A typical plastic material is for example PVdC. The special plastic material is frequently temperature sensitive. On the other hand for the purpose of a satisfactory bonding with the usual plastic material the special plastic material must have a temperature which coincides sufficiently with the standard plastic material.

In a known extruder die (Plastics World, August 1984, p.17) a passage in the block forms an additional feed channel. A nickel sleeve is inserted in this passage. An automatic tempering (temperature control) of the special plastic flow in the additional feed channel does not occur. The nickel sleeve is scarcely effective as a heat insulator. Accordingly the heat which reaches the thermoplastic material is so great that the block in the vicinity of the additional feed duct is so hot that the special plastic material is damaged on rheological grounds by overheating.

OBJECTS OF THE INVENTION

It is an object of our invention to provide an improved extruder die, particularly for extrusion of a thermoplastic material in the form of a plate or foil, which avoids this drawback.

It is also an object of our invention to provide an improved extruder die for making a multilayer thermoplastic laminate.

It is another object of our invention to provide an improved extruder die for making a multilayer thermoplastic laminate in which a special plastic material, particularly one useful for making a barrier layer, can be fed in through an additional feed channel without damage by overheating.

SUMMARY OF THE INVENTION

These objects and others which will become more readily apparent hereinafter are attained in accordance with our invention in an extruder die for extrusion of a multilayer thermoplastic laminate, particularly in the form of a foil or plate, comprising a multicomponent block symmetric with respect to a central plane symmetrically located along a plurality of feed channels and distributing channels connected to the feed channels, at least one mouth and central distributor channel connected to the mouth symmetric in relation to the axis of the extruder die as well as an outlet die following the central distributor channel. The block on the end opposite the outlet die has an additional feed channel with a round or rectangular cross section for feeding in a special plastic material. The additional feed channel changes over downstream into a feed duct extending to the mouth.

According to our invention the additional feed channel is located in a cartridge which has a plurality of tempering passages distributed over the periphery and length thereof and which is mounted in a cartridge receptacle (recess or socket) of the block and the cartridge moreover is provided with a plurality of feed ducts for providing a coating plastic material for the flow of the special plastic material.

Advantageously the feed ducts are positioned inside of the tempering passages, i.e. within the array of these longitudinal and transverse coolant-containing ducts. It is understood that the feed ducts for the coating plastic material open into the additional feed duct at a suitable position.

The cartridge within the scope of our invention can be an independent nozzle unit which is integrated with a classical extruder die by insertion in a cartridge receptacle of the block.

Of course the special plastic material is provided at a temperature which is required from rheological considerations for building the laminate which happens when the flow leaves the cartridge and enters the body of the extruder die. Surprisingly damage due to overheating does not occur.

Surprisingly also the bonding of the special plastic material in the laminate is satisfactory because it has the coating plastic which already has been bonded in the cartridge to the special plastic material. The coating plastic can be applied in a thin layer on the special plastic flow so the coating plastic material also can have a temperature which is elevated in contrast to the special plastic material without the special plastic material being damaged because the thin layer can only carry a small amount of heat to the core or central layer plastic while the material bonding occurs by temperature adjustment. For the coating material a standard plastic material can be used. It is applied to both the upper and lower sides of the flow of special plastic material. Metering pumps can be positioned between the extruder and the individual connectors inlets to control the respective synthetic-resin or plastic flows.

Advantageously the cartridge comprises a shaft member and an enlarged head piece, the head piece having connector devices for feeding in special plastic material and the coating plastic material. Between head piece and block heat insulating inserts are mounted.

The independent temperature of the cartridge can be provided in different ways, for example by sending a heat carrier through the tempering passages.

Thus with the help of process engineering principles practically any temperature for the cartridge and thus for the special plastic can be obtained and regulated.

Also advantageously to simplify the tempering some of the tempering passages axially penetrate the shaft member and the head piece while others of the tempering passages are additional cooling passages in the head piece.

Equilibrating passages (also referred to herein as tempering passages) can be closed passages, in which a fluid is condensable and vaporizable in this temperature range, which only partially fills the equilibrating passages and guarantees that over the length which the equilibrating passages extend the temperature is uniform and heat is transferred to the cooling passages which are found in the head piece and the temperature required for the above described heat exchange is set. In this structure also heat insulating inserts are of particularly significance and are positioned between the head piece and the block. Additionally the temperature passages can be located also in the vicinity of the central distributor channel.

BRIEF DESCRIPTION OF THE DRAWING

The above and other objects, features and advantages of our present invention will become more readily apparent from the following description, reference being made to the accompanying highly diagrammatic drawing in which:

FIG. 2 is an end on view of the apparatus of FIG. 1 as seen in the direction of the arrow II in FIG. 1; and FIG. 3 is a plan view, broken away, of the cartridge withdrawn from the block.

SPECIFIC DESCRIPTION

Figure 1:
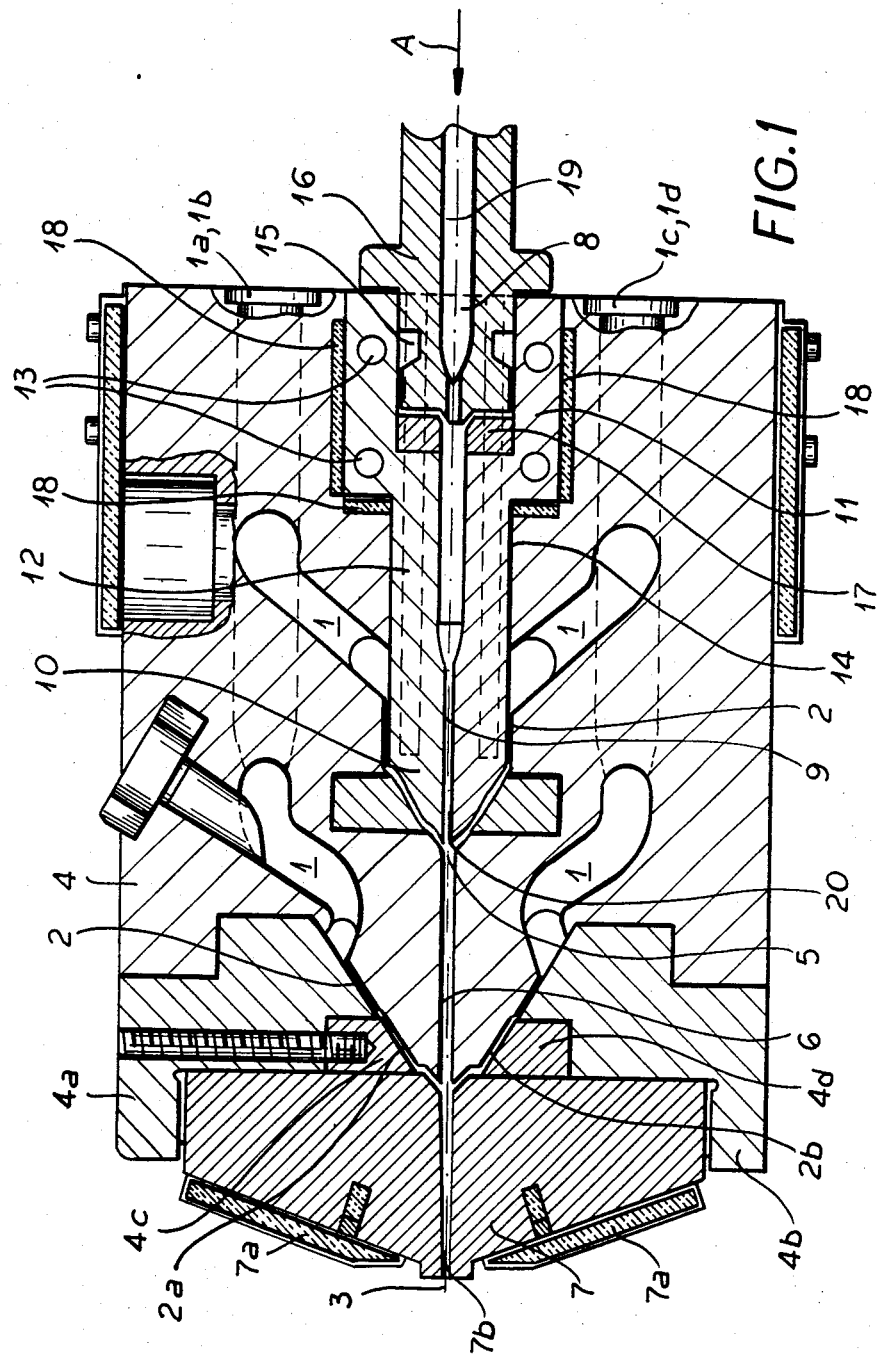
FIG. 1 is an axial cross sectional view through an extruder die according to our invention.

The extruder die shown in the drawing acts to extrude a multilayer thermoplastic laminate in the form of a foil or a plate.

This extruder die basically comprises a multicomponent block 4 symmetric with respect to a central plane 3 and having a plurality of feed channels 1 and distributing channels 2.

One sees from FIG. 1 a mouth 5 and a central distributor channel 6 the output die 7 is connected. The central distributor channel 6 is connected to the mouth 5 and positioned in the central plane 3 symmetrically in relation to the longitudinal axis of the extruder die.

The die 7 is covered with insulating plates 7a and has a converging outlet 7b at which the passages 2a and 2b, which fan out in this direction in a coat-hanger pattern, terminate, blocks 4a and 4b assist in defining these passages whose thickness are controlled by bars 4c and 4d to regulate the respective layer thicknesses. The channels receive respective streams of plastic at 1a, 1b, 1c and 1d respectively.

The block 4 has an axial additional feed channel 8 which has a rectangular or round cross section for feeding special plastic materials on the end opposite the output die 7. This additional channel 8 changes over downstream into a discharge duct 9 extending to the mouth 5. In this embodiment of our invention the distributing channels 2 are configured in the shape of a coat hanger.

The additional feed channel 8 is located in a cartridge 10, 11 which has tempering passages 12,13 distributed over its length as well as its periphery and which is mounted in a cartridge receptacle 14 of the block 4.

These passages shown are broken away at 12a and 12b in FIG. 3 where they are otherwise represented by dot-dash lines.

The cartridge 10,11 is moreover provided with feed ducts 15 for application of a coating plastic material to the special plastic material. These feed ducts 15 are positioned inside the tempering passages 12,13 and of course in this embodiment above and below the additional feed channel 8.

The cartridge 10,11 comprises a shaft member 10 and an enlarged head piece 11 (FIG. 3).

The head piece 11 has, as seen in FIG. 2, connector devices 16,17 for feeding of special plastic and coating plastic material. Between head piece 11 and the block 4 there are heat insulating inserts 18.

The tempering passages 12,13 include axial equlibrating passages 12 through the shaft member 10 and the head piece 11 and additional cooling passages 13 positioned in the head piece 11. The passages 13 are traversed by a coolant.

Equilibrating passages 12 are closed passage which are filled partially with a vaporizable and recondensable fluid. The special plastic is fed by the entrance channel 19 into the additional feed channel 8 and is covered uniformly by coating plastic material fed into the entrance region through the feed ducts 15 and into the connected discharge duct 9.

It is tempered in the cartridge 10,11 and at its outlet experiences a temperature discontinuity in which the temperature is increased which is the rheological basis for its integration with the other plastic material in the outflow. This temperature discontinuity causes no overheating damage. An intimate bond is ensured by the coating plastic materials which are usually blended into the plastic material of the additional laminate layers.

The coating plastic is fed from inlet 17 via passage 17a its outlet 17g communicating with the passages 15 from which it flows to the gap 17b to coat the heat sensitive central stream.

We claim:

1. An extruder die for extrusion of a multilayer thermoplastic laminate in the form of a foil or plate, comprising:
    a multicomponent block having a plurality of feed channels with distributing channels connected thereto for forming the layers of said multilayer thermoplastic laminate and a central distributor channel connected to said feed channels and said distributing channels;
    an output die connected to said central distributor channel and mounted on said multicomponent block; and
    a cartridge mounted in a cartridge receptacle in said multicomponent block having a shaft member and an enlarged head piece and said cartridge containing an additional feed channel for feeding in a special plastic material for said thermoplastic laminate, a plurality of feed ducts for providing a coating plastic material to said special plastic material and a plurality of tempering passages distributed over the periphery and length of the cartridge.

2. The extruder die according to claim 1 wherein said feed ducts are located inwardly of said tempering passages.

3. The extruder die according to claim 2 wherein said head piece having a plurality of connector devices for feeding said special plastic material and said coating plastic material and a plurality of heat insulating inserts are positioned between said head piece and said block.

4. The extrusion die according to claim 3 wherein some of said plurality of said tempering passages are axially fed through said shank member and said head piece and others of said plurality of said tempering passages are constructed as additional cooling passages positioned in said head piece.

5. The extrusion die according to claim 4 wherein said tempering passages are also positioned near said central distributor channel.

6. A multilayer-extrusion head comprising:

an extrusion block formed at one side with a broad-slit outlet discharging a laminate composed of a multiplicity of layers of synthetic resin, said block comprising:

a central passage formed in said block and extending from a location spaced at a distance from an opposite side of said block to said slit, a plurality of layer forming passages formed in said block on opposite sides of said central passage and each widening toward and joining said central passage in the direction of said slit for laminating respective layers of synthetic resin onto a central layer thereof thereby forming the laminate discharged from said slit, respective inlets for each of said passages on opposite sides of said central passage for delivering a respective one of said synthetic resins thereto, and means forming a socket recess in said body opening at said opposite side of said body and terminating at said location; and a cartridge removably received in said recess, said cartridge having:

a head of relatively large thickness at said opposite side of said body, a shank of relatively small thickness extending from said head to said location, a central cartridge passage opening at said head and communicating with said central passage of said body at said location, respective longitudinal coolant passages formed in said shank parallel to said central cartridge passage, and respective transverse coolant passages formed in said head transverse to said central cartridge passage, and an inlet for a central layer of synthetic resin connected to said central cartridge passage formed on said cartridge whereby overheating of the synthetic resin of said central layer is prevented by the abstracting of heat by a coolant in said longitudinal and transverse coolant passages.

7. The extrusion head defined in claim 6 wherein a further inlet is provided in said cartridge for a cover synthetic resin and said cartridge has a further passage connected said further inlet to said central cartridge passage to cover the synthetic resin layer of said central passage with a cover layer of said further synthetic resin layer.

8. The extrusion head defined in claim 6 wherein said inlets and said central cartridge passage are located within an array of said coolant passages.

* * * * *